Figure 2:
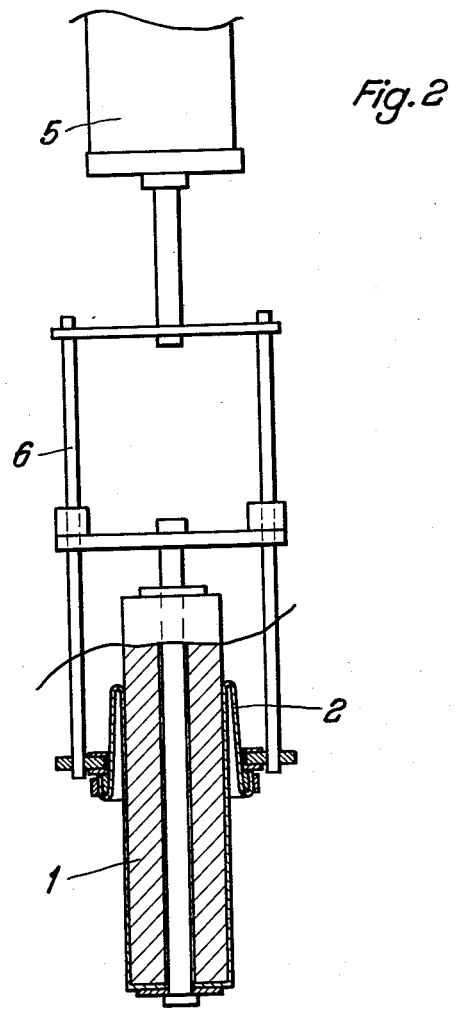

June 30, 1964            K. LEIBIGER            3,139,366
APPARATUS FOR THE PRODUCTION OF ANNULAR ROLLED-UP ELEMENTS
Filed Dec. 14, 1960            2 Sheets-Sheet 1
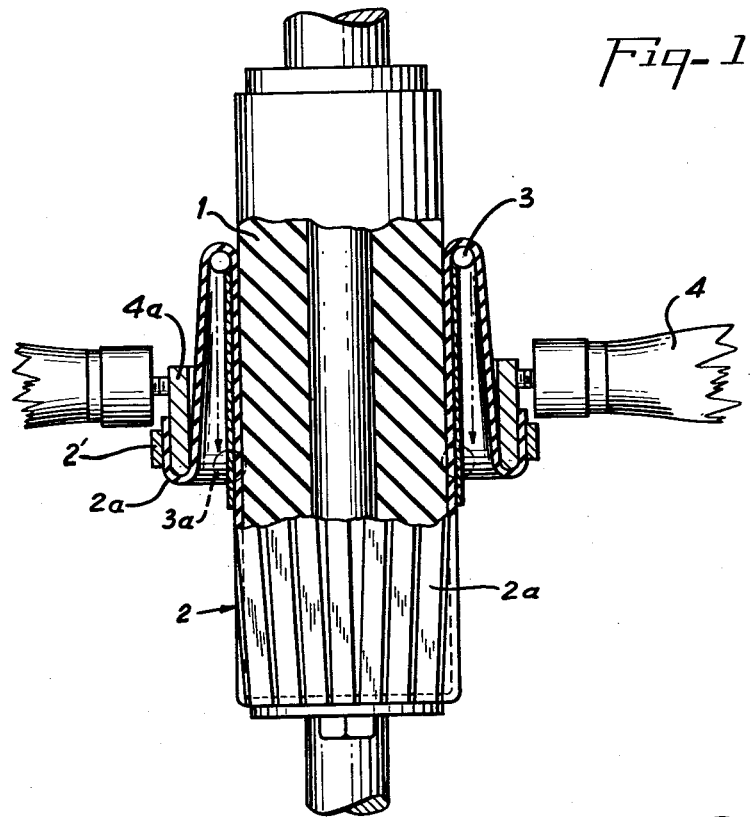
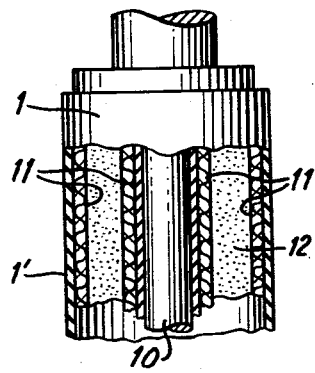
INVENTOR.
KURT LEIBIGER
BY
ATTORNEYS

United States Patent Office 3,139,366
Patented June 30, 1964

---

3,139,366
APPARATUS FOR THE PRODUCTION OF ANNULAR ROLLED-UP ELEMENTS
Kurt Leibiger, 111 Hammersteindamm, Hamburg, Germany
Filed Dec. 14, 1960, Ser. No. 75,872
Claims priority, application Germany Feb. 6, 1960
5 Claims. (Cl. 156—443)

This invention relates to an apparatus for producing annular rolled-up elements from a resilient substance such as woven or knitted fabrics, foils, plates or layers of rubber or paper or metals, preferably with impregnation by rubber or synthetic resin or the like, the apparatus comprising a mandrel over which a turned-over stocking is engaged, the material to be rolled being engaged over such stocking, and the stocking being drawn off the mandrel in turned-over fashion to roll up the material. In the prior art systems of producing annular rolled-up elements, a flexible tubular element is rolled up after the fashion of a bead, with or without joints produced by seaming or sticking or other means, and is simultaneously or subsequently fixed by sticking or some other means. When this system is performed manually, the elements are uneven in cross-section and creased. The elements can be made smooth if they are formed on a mandrel but density and hardness cannot be satisfactorily adapted to the material from which they are made nor to the particular purpose for which they are to be used. When cylindrical mandrels are used, the fabrics are subjected to excessive elongation as the thickness of the bead increases, while laminated substances having layers with different elongation properties become creased and distorted. Endeavours have been made to use conical mandrels which by their conicity make some allowance for increasing bead thickness. In such a case the conicity of the mandrel must be adapted fairly accurately to the increasing bead thickness to ensure that the substances which it is desired to roll adhere firmly enough to the mandrel and do not slip when they are being rolled. Due to this requirement of accurate fit, a conical mandrel cannot be used for a number of different purposes.

To obviate the disadvantages of the known arrangements and to provide uncreased annular elements of uniform cross-section and of a density or hardness adapted to the particular purpose for which they are to be used, the present invention provides a resilient mandrel for an apparatus for producing annular rolled-up elements. A resilient mandrel can yield as bead thickness increases and become constricted to some extent as the pressure increases. The fabrics or the like which are rolled on the apparatus according to the invention are subjected to less elongation, nor is there any creasing with laminated substances consisting of a number of layers each having different elongation properties. The mandrel according to the invention need not be exactly adapted in size to the diameter of the required roll and can be used for many different jobs. In one embodiment of the invention the mandrel consists of an elastomeric substance, the elasticity of which is adjusted as required. In another embodiment of the invention the mandrel consists of a flexible tube filled with a fluid, such as a gas or a liquid, in which case the flexible tube can be stiffened with fabric inserts or the like, the inserts being attached to the inner face of said flexible tube mandrel by usual means. According to another feature of the invention, the apparatus for the production of annular rolled-up elements can comprise a pressure-medium-operated drive, such as a compressed air cylinder, for drawing the turned-over stocking off the mandrel. Such drive replaces a manual drive. The turned-over stocking which is drawn on to the mandrel can be, for instance, a portion of flexible tubing made of rubber or some other sufficiently flexible or resilient substance, with or without an insert. Alternatively, the turned-over stocking can be formed from a large number of individual strips.

Specific embodiments of the invention will now be described by way of example with reference to the accompanying drawings, in which:

FIGURE 1 shows a manually operated device, and
FIGURE 1A shows a modified form of the invention.
FIGURE 2 shows a device operated by compressed air.

Referring now to FIGURE 1, the device comprises a resilient mandrel 1 over which is engaged a turned-over stocking or tubing 2 consisting of a number of strips 2a. The material which it is desired to roll up is engaged over the stocking. The end of the outer fold is gripped between elements 2a and 4a, the latter being attached to operating device 4, which constitutes means for pulling down the outer fold. The turned-over stocking forms an inner fold adjacent to the mandrel and an outer fold. Material 3 to be rolled is held at the junction of said folds and a roll of said material is formed at said junction. As the stocking 2, held by band 2', is drawn down the mandrel 1 by means of a manually operated device 4, the material on the stocking 2 is rolled up as shown at 3 and is eventually formed into an annular rolled-up element 3a. Element 3 is of a resilient substance such as woven or knitted fabrics, foils, plates or layers of rubber or paper or metal, preferably impregnated with rubber or synthetic resin or the like.

In the embodiment shown in FIGURE 2 the formation of the annular rolled-up element is the same as in FIGURE 1, but the turned-over stocking 2 is drawn down the resilient mandrel 1 by means of a compressed air device comprising a compressed air cylinder 5 connected by way of a linkage 6 to the stocking 2.

Referring to the modified form shown in FIG. 1A, mandrel 1 has a flexible closed tube 1 surrounding post 10, which acts as a support. The tube is lined with fabric 11 to stiffen it. The interior 12 of the tube is filled with a gas 12, which may be air; or it may contain a liquid.

The annular rolled-up elements produced by the apparatus according to the invention can be used, for instance, as blanks for V belts or as similar endless annular elements.

I claim:

1. Apparatus for producing annular rolled-up elements of a resilient substance comprising a substantially cylindrical mandrel of resilient material, a flexible stocking on said mandrel, said stocking being turned over on itself to form an inner fold contacting said mandrel and an outer fold spaced from said inner fold, means for gripping the end of said outer fold, said inner fold adapted to contact tubing material to be rolled, and means for pulling down said outer fold to roll up said material at the junction of said folds.

2. Apparatus as claimed in claim 1, characterized in that the mandrel consists of a fluid-filled tubular element.

3. Apparatus as claimed in claim 2, characterized in that the tubular element is stiffened by fabric inserts.

4. Apparatus as claimed in claim 1, characterized in that the rolled-over stocking is drawn off the mandrel by a pressure-medium-operated drive.

5. Apparatus as claimed in claim 1, characterized in that the rolled-over stocking is formed from a number of individual longitudinal strips.

References Cited in the file of this patent
UNITED STATES PATENTS

| | | |
|---|---|---|
| 678,317 | Kendall | July 9, 1901 |
| 1,352,470 | Palmer | Sept. 14, 1920 |
| 1,557,680 | Fleischli | Oct. 20, 1925 |
| 1,592,809 | Stevens | July 13, 1926 |
| 2,916,136 | Combs | Dec. 8, 1959 |
| 2,926,699 | Wulms | Mar. 1, 1960 |
| 2,944,588 | Sannipoli et al. | July 12, 1960 |